(12) United States Patent
Jiang et al.

(10) Patent No.: US 11,910,467 B2
(45) Date of Patent: Feb. 20, 2024

(54) CHANNEL DETECTION INDICATION METHOD, TERMINAL, AND NETWORK DEVICE

(71) Applicant: VIVO MOBILE COMMUNICATION CO., LTD., Guangdong (CN)

(72) Inventors: Dajie Jiang, Chang'an Dongguan (CN); Xueming Pan, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 532 days.

(21) Appl. No.: 17/152,405

(22) Filed: Jan. 19, 2021

(65) Prior Publication Data
US 2021/0144798 A1 May 13, 2021

Related U.S. Application Data

(63) Continuation of application No. PCT/CN2019/096688, filed on Jul. 19, 2019.

(30) Foreign Application Priority Data

Jul. 20, 2018 (CN) .......................... 201810806639.7

(51) Int. Cl.
*H04W 76/28* (2018.01)
*H04L 41/0803* (2022.01)
(Continued)

(52) U.S. Cl.
CPC ......... *H04W 76/28* (2018.02); *H04L 41/0803* (2013.01); *H04W 24/08* (2013.01); *H04W 72/23* (2023.01)

(58) Field of Classification Search
CPC . H04L 41/0803; H04L 5/0007; H04L 5/0048; H04L 5/0053; H04L 5/0055;
(Continued)

(56) References Cited

U.S. PATENT DOCUMENTS

2014/0126490 A1* 5/2014 Chen .................... H04L 5/0035
                                                        370/328
2015/0003311 A1 1/2015 Feuersaenger et al.
(Continued)

FOREIGN PATENT DOCUMENTS

CN  102036346 A  4/2011
CN  102891728 A  1/2013
(Continued)

OTHER PUBLICATIONS

EP Search Report in Application No. 19838133.7 dated Jul. 9, 2021.
(Continued)

*Primary Examiner* — Mansour Oveissi
(74) *Attorney, Agent, or Firm* — Maschoff Brennan

(57) ABSTRACT

This disclosure discloses a channel detection indication method, a terminal, and a network device. The method includes: obtaining at least two sets of configuration information, where the at least two sets of configuration information are related to monitoring a physical downlink control channel PDCCH; determining target configuration information from the at least two sets of configuration information; and monitoring the PDCCH based on the target configuration information.

13 Claims, 4 Drawing Sheets

(51) Int. Cl.
*H04W 24/08* (2009.01)
*H04W 72/23* (2023.01)

(58) Field of Classification Search
CPC ............... H04L 5/0094; H04W 24/08; H04W 52/0216; H04W 52/0229; H04W 52/028; H04W 72/23; H04W 76/28; Y02D 30/70
See application file for complete search history.

(56) References Cited

U.S. PATENT DOCUMENTS

| | | | |
|---|---|---|---|
| 2015/0009832 | A1 | 1/2015 | Dalsgaard et al. |
| 2017/0070982 | A1 | 3/2017 | Kawasaki |
| 2018/0049203 | A1 | 2/2018 | Xue et al. |
| 2018/0183551 | A1 | 6/2018 | Chou et al. |
| 2019/0230698 | A1 | 7/2019 | Ai |
| 2019/0349915 | A1 | 11/2019 | Ahn et al. |
| 2020/0296673 | A1 | 9/2020 | Ouchi et al. |
| 2021/0029710 | A1* | 1/2021 | Jiang ................. H04W 72/0453 |

FOREIGN PATENT DOCUMENTS

| | | |
|---|---|---|
| CN | 103889039 A | 6/2014 |
| CN | 105409310 A | 3/2016 |
| CN | 106034318 A | 10/2016 |
| CN | 106533633 A | 3/2017 |
| CN | 106604376 A | 4/2017 |
| CN | 107197508 A | 9/2017 |
| CN | 107734705 A | 2/2018 |
| CN | 108200640 A | 6/2018 |
| WO | 2013141530 A1 | 9/2013 |
| WO | 2015/198490 A1 | 12/2015 |
| WO | 2017/057870 A1 | 4/2017 |
| WO | 2017/135044 A1 | 8/2017 |
| WO | 2018/106043 A1 | 6/2018 |
| WO | 2018-132672 A1 | 7/2018 |
| WO | 2018128351 A1 | 7/2018 |

OTHER PUBLICATIONS

CN Office Action in Application No. 201810806639.7 dated May 22, 2020.
"Discussion on NR-PDCCH monitoring" 3GPP TSG RAN WG1 Meeting #89, R1-1707496, CATT, May 15, 2017.
"PDCCH Coreset configuration and UE procedure on NR-PDCCH" 3GPP TSG RAN WG1 meeting #89, R1-1707703, Guangdong OPPO Mobile Telecom, May 15, 2017.
"Discussions on search space and CORESET designs" MediaTek Inc., 3GPP TSG RAN WG1 Meeting #90bis, R1-171823, Oct. 9, 2017.
"UE procedure of PDCCH monitoring for URLLC", 3GPP TSG RANG WG1 NR Meeting #91, R1-1719405, Huawei, HiSilicon, Nov. 27, 2017.
"On EU Power Savings" 3GP TSG RAN WG1 Meeting #92, R1-1801977, Samsung, Feb. 26, 2018.
"Discussion on NR DRX configuration in RRC_CONNECTED state" 3GPP TSG-RAN WG2 NR Ad Hoc, R2-1707073, Jun. 27, 2017.
"Timer-based BWP switching" 3GPP TSG-RAN WG2 Nr #99bis Meeting, R2-1711199, Samsung, Oct. 9, 2017.
"DCI-based mechanism in skipping PDCCH monitoring and switching PDCCH monitoring periodicity", 3GPP TSG-RAN WG2 Meeting #106, vivo, R2-1905956, May 13, 2019.
Written Opinion and International Search Report in Application No. PCT/CN2019/096688 dated Feb. 4, 2021.
JP Office Action in Application No. 2021-525357 dated Jan. 25, 2022.
"Remaining Issues on BWP" 3GPP TSG RAN WG1 Meeting AH 1801, R1-1800879, Jan. 22, 2018, Qualcomm Incorporated.
"Remaining Issues on DL/UL Resource Allocation" 3GPP TSG-RAN WG1 Meeting #93, Qualcomm Incorporated, R1-1807652, May 21, 2018.
JP Office Action in Application No. 2021-525357 dated Aug. 9, 2022.
SG Office Action in Application No. 11202100192S dated Sep. 28, 2022.
"DRX with short onDuration and Wake-up signaling" 3GPP TSG-RAN WG2 #101bis, Ericsson, R2-1805405, Apr. 16, 2018.
Intel Corporation., "Miscellaneous corrections for UE capabilities," 3GPP TSG-RAN WG2 NR Ad-Hoc, R2-1810970, pp. 1-20, (Jul. 2-6, 2018).
JP Office Action dated Mar. 7, 2023 as received in Application No. 2021-525357.
JP Office Action dated Sep. 12, 2023 as received in Application No. 2021-525357.

* cited by examiner

Send, via radio resource control RRC signaling, at least two sets of configuration information to a terminal, where the at least two sets of configuration information are related to monitoring a physical downlink control channel PDCCH — 61

CHANNEL DETECTION INDICATION METHOD, TERMINAL, AND NETWORK DEVICE

CROSS-REFERENCE TO RELATED APPLICATIONS

This application is a continuation application of International Application No. PCT/CN2019/096688 filed on Jul. 19, 2019, which claims priority to Chinese Patent Application No. 201810806639.7, filed in China on Jul. 20, 2018, which is incorporated herein by reference in its entirety.

TECHNICAL FIELD

This disclosure relates to the field of communications technologies, and in particular, to a channel detection indication method, a terminal, and a network device.

BACKGROUND

In a mobile communications system, a discontinuous reception (DRX) mechanism is proposed to save power for a terminal. In a DRX scenario, a DRX cycle is configured for a terminal in a connected state. As shown in FIG. 1, the DRX cycle includes an on-duration and an opportunity for DRX. During the on-duration, the terminal monitors and receives a physical downlink control channel (PDCCH). During the opportunity for DRX, the terminal does not receive data of a downlink channel In most cases, after a terminal is scheduled for receiving or sending data in a subframe, the terminal is most likely to continue to be scheduled in subsequent several subframes. Therefore, the terminal remains in the on-duration after being scheduled, that is, the terminal continues to monitor the PDCCH in the configured on-duration. Specifically, when the terminal is scheduled to initially transmit data, the terminal starts or restarts a DRX-inactivity timer. The terminal always remains in the on-duration before the timer expires. A PDCCH monitoring parameter (such as a monitoring periodicity) is notified by a network device to the terminal via radio resource control (RRC) signaling. In this way, monitoring parameters of the terminal are the same in different scenarios (such as the on-duration and a running period of the DRX-inactivity timer). For example, a service packet arrival cycle in the on-duration is 20 ms, and a service packet arrival cycle in the running period of the DRX-inactivity timer is 2 ms. If a PDCCH monitoring cycle configured by the network device is 2 ms, the terminal performs frequent blind monitoring on the PDCCH, but no grant information (including uplink grant and downlink grant) is detected, which is not conducive to power saving for the terminal. If the PDCCH monitoring cycle configured by the network device is 20 ms, a PDCCH that arrives during the running period of the DRX-inactivity timer is undetected, which leads to poor transmission reliability.

SUMMARY

Embodiments of this disclosure provide a channel detection indication method, a terminal, and a network device, to resolve problems of improper PDCCH monitoring, additional power consumption of a terminal, and poor transmission reliability that may be caused if a same PDCCH monitoring parameter is used in different scenarios.

According to a first aspect, an embodiment of this disclosure provides a channel detection indication method, applied to a terminal and including:
 obtaining at least two sets of configuration information, where the at least two sets of configuration information are related to monitoring a physical downlink control channel PDCCH;
 determining target configuration information from the at least two sets of configuration information; and
 monitoring the PDCCH based on the target configuration information.

According to a second aspect, an embodiment of this disclosure further provides a terminal, including:
 an obtaining module, configured to obtain at least two sets of configuration information, where the at least two sets of configuration information are related to monitoring a physical downlink control channel PDCCH;
 a processing module, configured to determine target configuration information from the at least two sets of configuration information; and
 a monitoring module, configured to monitor the PDCCH based on the target configuration information.

According to a third aspect, an embodiment of this disclosure provides a terminal. The terminal includes a processor, a memory, and a program stored in the memory and running on the processor, where when the program is executed by the processor, the steps of the channel detection indication method according to the first aspect are implemented.

According to a fourth aspect, an embodiment of this disclosure provides a channel detection indication method, applied to a network device and including:
 sending, via radio resource control RRC signaling, at least two sets of configuration information to a terminal, where the at least two sets of configuration information are related to monitoring a physical downlink control channel PDCCH.

According to a fifth aspect, an embodiment of this disclosure provides a network device, including:
 a first sending module, configured to send, via radio resource control RRC signaling, at least two sets of configuration information to a terminal, where the at least two sets of configuration information are related to monitoring a physical downlink control channel PDCCH.

According to a sixth aspect, an embodiment of this disclosure further provides a network device. The network device includes a processor, a memory, and a program stored in the memory and running on the processor, where when the processor executes the program, the steps of the channel detection indication method according to the fourth aspect are implemented.

According to a seventh aspect, an embodiment of this disclosure provides a computer-readable storage medium, where the computer-readable storage medium stores a program, and when the program is executed by a processor, the steps of the foregoing terminal side or network device side channel detection indication method are implemented.

In this way, based on the foregoing technical solutions, the embodiments of this disclosure can satisfy PDCCH monitoring in different scenarios and improve transmission efficiency without additional power consumption.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

Figure 1:
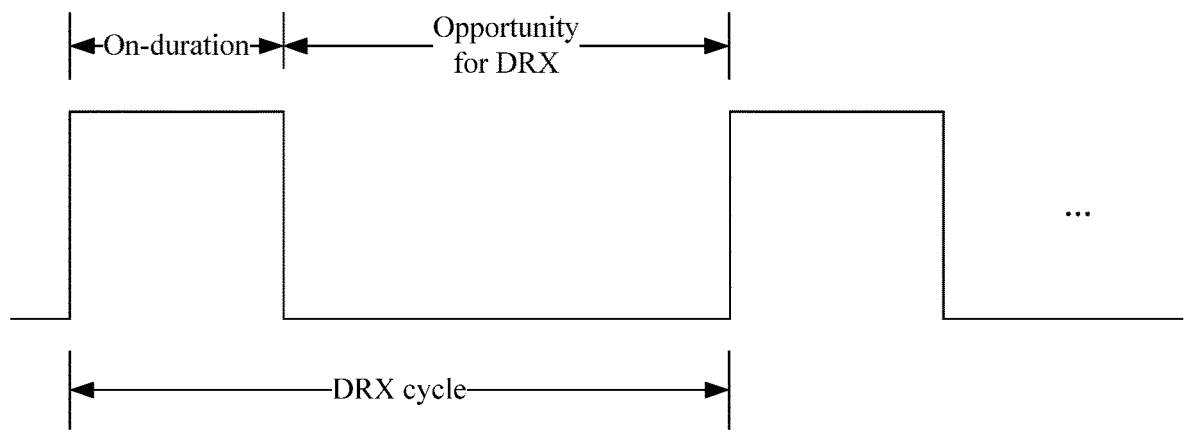
FIG. 1 presents a schematic diagram of time domain of a DRX cycle.

The following describes example embodiments of this disclosure in more detail with reference to the accompanying drawings. Although the example embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure and completely convey the scope of this disclosure to a person skilled in the art.

The terms "first", "second", and the like in this specification and claims of this application are used to distinguish between similar objects instead of describing a specific order or sequence. It should be understood that the data used in this way is interchangeable in appropriate circumstances so that the embodiments of this application described herein can be implemented in other orders other than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device. Use of "and/or" in the specification and claims represents at least one of connected objects.

The technologies described herein are not limited to long term evolution (LTE)/LTE-Advanced (LTE-A) system, and are also applicable to various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are often used interchangeably. The technologies described in this specification may be used for the foregoing systems and radio technologies, and may also be used for other systems and radio technologies. However, in the following descriptions, an NR system is described for an illustration purpose, and NR terms are used in most of the following descriptions, although these technologies may also be applied to other applications than an NR system application.

Examples provided in the following descriptions are not intended to limit the scope, applicability, or configuration described in the claims. Functions and arrangements of discussed elements may be changed without departing from the spirit and scope of this disclosure. Various examples may be properly omitted, replaced, or added various procedures or components. For example, the described method may be performed in an order different from the described order, and steps may be added, omitted, or combined. In addition, features described with reference to some examples may be combined in other examples.

Figure 2:
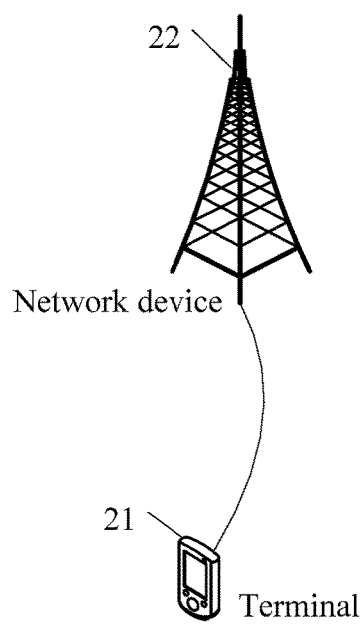
FIG. 2 presents a block diagram of a mobile communications system applicable to an embodiment of this disclosure.

FIG. 2 is a block diagram of a wireless communications system applicable to an embodiment of this disclosure. The wireless communications system includes a terminal 21 and a network device 22. The terminal 21 may also be referred to as a terminal device or user equipment (UE). The terminal 21 may be a terminal side device such as a mobile phone, a tablet computer, a laptop computer, a personal digital assistant (PDA), a mobile internet device (MID), a wearable device, or an in-vehicle device. It should be noted that the terminal 21 is not limited to any specific type in the embodiments of this disclosure. The network device 22 may be a base station or a core network, where the base station may be a base station of 5G (the fifth generation) or a later version (for example, gNB or 5G NR NB), or a base station in other communications systems (for example, an eNB, a WLAN access point, or another access points). The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a wireless local area network (WLAN) access point, a Wi-Fi node, or some other appropriate term in the art. As long as the same technical effect is achieved, the base station is not limited to a specific technical term. It should be noted that the base station in the NR system is taken only as an example in the embodiments of this disclosure, but a specific type of the base station is not limited.

The base station may communicate with the terminal 21 under the control of a base station controller. In various examples, the base station controller may be a part of the core network or some base stations. Some base stations may perform communication of control information or user data with the core network by using backhauls. In some examples, some of these base stations may communicate with each other directly or indirectly by using backhaul links. The backhaul links may be wired or wireless communications links. The wireless communications system may support operations on multiple carriers (wave signals of different frequencies). A multi-carrier transmitter can transmit modulated signals on the multiple carriers simultaneously. For example, multi-carrier signals modulated by using various radio technologies may be transmitted on each communications link. Each modulated signal may be sent on different carriers and may carry control information (for example, a reference signal or a control channel), overhead information, data, and the like.

The base station may communicate wirelessly with the terminal 21 through one or more access point antennas. Each base station may provide communication coverage for a corresponding coverage area of the base station. A coverage area of an access point may be divided into sectors forming only a part of the coverage area. The wireless communications system may include different types of base stations (for example, a macro base station, a micro base station, or a picocell base station). The base station may also use different radio technologies, such as cellular and WLAN radio access technologies. The base station may be associated with a same or different access networks or operator deployments. Coverage areas of different base stations (including coverage areas of base stations of a same type or different types, coverage areas using a same radio technology or different radio technologies, or coverage areas of a same access network or different access networks) may overlap each other.

Communication links in the wireless communications system may include an uplink for carrying uplink (UL) transmission (for example, from the terminal 21 to the network device 22), or a downlink for carrying downlink (DL) transmission (for example, from the network device 22 to the terminal 21). The UL transmission may also be referred to as reverse link transmission, while the DL transmission may also be referred to as forward link transmission.

Figure 3:
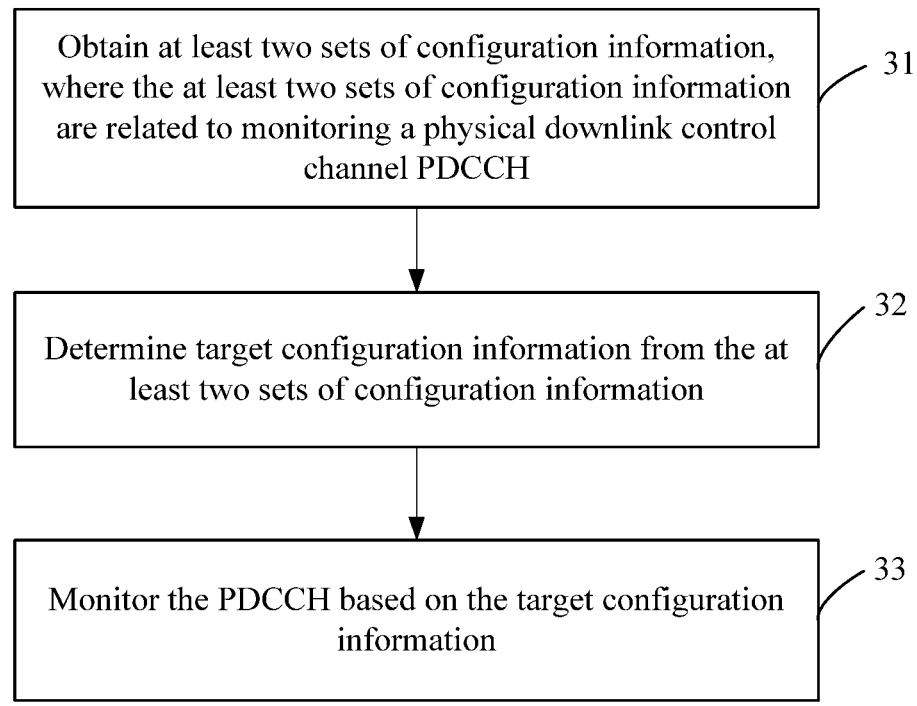
FIG. 3 presents a schematic flowchart of a channel detection indication method of a terminal according to an embodiment of this disclosure.

An embodiment of this disclosure provides a channel detection indication method applied to a terminal. As shown in FIG. 3, the method includes the following steps: 31 to 33.

Step 31: Obtain at least two sets of configuration information, where the at least two sets of configuration information are related to monitoring a physical downlink control channel PDCCH.

The at least two sets of configuration information each correspond to PDCCH monitoring in different scenarios. For example, the at least two sets of configuration information include configuration information 1, configuration information 2, and configuration information 3. The three sets of configuration information are each used for PDCCH monitoring of the terminal in a connected state, a long DRX cycle, and a short DRX cycle.

The at least two sets of configuration information may be predefined (for example, agreed on in a protocol), or the at least two sets of configuration information may be configured by a network device via radio resource control (RRC) signaling or signaling of another type.

Step 32: Determine target configuration information from the at least two sets of configuration information.

This means that one set of configuration information that meets a requirement of a scenario is selected from the at least two sets of configuration information as the target configuration information. Optionally, one set of configuration information that most fits a requirement of a current scenario is selected from the at least two sets of configuration information as the target configuration information. For example, when the current terminal is in the connected state, the configuration information 1 is selected as the target configuration information. When the current terminal is in the long DRX cycle, the configuration information 2 is selected as the target configuration information.

Step 33: Monitor the PDCCH based on the target configuration information.

In this way, one set of configuration information that most fits a PDCCH monitoring requirement of a current scenario is selected from the at least two sets of configuration information as the target configuration information. This can satisfy PDCCH monitoring in different scenarios and improve transmission efficiency without additional power consumption.

The PDCCH in this embodiment of this disclosure corresponds to at least one DCI format and/or the PDCCH corresponds to at least one radio network temporary identifier (RNTI). The DCI format includes but is not limited to formats listed in the following Table 1:

TABLE 1

| DCI format | Meaning |
|---|---|
| 0_0 | Scheduling of a physical uplink shared channel (PUSCH) in one cell |
| 0_1 | Scheduling of a PUSCH in one cell |
| 1_0 | Scheduling of a physical downlink shared channel (PDSCH) in one cell |
| 1_1 | Scheduling of a PDSCH in one cell |
| 2_0 | Notifying a group of UEs of the slot format |
| 2_1 | Notifying a group of UEs of the physical resource blocks (PRB) and OFDM symbols where UE may assume that no downlink transmission is intended for the UE. |
| 2_2 | Transmission of Transmit power control TPC commands for physical uplink control channel (PUCCH) and PUSCH |
| 2_3 | Transmission of a group of TPC commands for sounding reference signal (SRS) transmissions by one or more UEs |

DCI formats 0_0, 0_1, 1_0, and 1_1 are scheduling DCI, and the other DCI formats are non-scheduling DCI.

Optionally, the PDCCH corresponds to at least one of preset scheduling DCI formats, for example, one of the DCI formats 0_0, 0_1, 1_0, and 1_1.

Further, RNTIs supported by the system include but are not limited to the following different types:
(1) System information radio network temporary identifier (SI-RNTI);
(2) Random access radio network temporary identifier (RA-RNTI);
(3) Temporary cell radio network temporary identifier (TC-RNTI);
(4) Cell radio network temporary identifier (C-RNTI);
(5) Paging radio network temporary identifier (P-RNTI);
(6) Interrupted transmission radio network temporary identifier (INT-RNTI);
(7) Slot format indicator radio network temporary identifier (SFI-RNTI);
(8) Transmit power control (TPC) of PUSCH radio network temporary identifier (TPC-PUSCH-RNTI);
(9) TPC of PUCCH radio network temporary identifier (TPC-PUCCH-RNTI);
(10) Configured scheduling radio network temporary identifier (CS-RNTI); and
(11) Semi-persistent radio network temporary identifier (SP-RNTI).

Optionally, the PDCCH corresponds to at least one of C-RNTI and CS-RNTI.

Step 32 in this embodiment of this disclosure may be implemented with reference to but not limited to the following manner 1, manner 2, and manner 3.

Manner 1: One set of configuration information indicated by the DCI is selected from the at least two sets of configuration information based on downlink control information (DCI), as the target configuration information.

The DCI herein may be scheduling DCI, or may be non-scheduling DCI. In other words, the network device configures, via RRC, the at least two sets of configuration information that are related to PDCCH monitoring in different scenarios, and dynamically indicates, through the DCI, the terminal to select one set for PDCCH monitoring.

Alternatively, the at least two sets of configuration information that are related to PDCCH monitoring in different scenarios are predefined. The network device dynamically indicates, through the DCI, the terminal to select one set for PDCCH monitoring. This can satisfy PDCCH monitoring in different scenarios and improve transmission efficiency without additional power consumption.

In this manner, before Step 32, the method further includes: detecting the DCI; and sending, based on a detection result of the DCI, an acknowledgement or a non-acknowledgement ACK/NACK to the network device. Specifically, if the DCI is detected, the terminal sends the ACK to the network device. Or, if the DCI is not detected, the terminal sends the NACK to the network device. This means that if it is defined that the terminal sends only the ACK, the terminal sends the ACK when the DCI is received, and does not send any information when the DCI is not received. If it is defined that the terminal sends only the NACK, the terminal does not send any information when the DCI is received, and sends the NACK when the DCI is not received. If it is defined that the terminal can send both the ACK and NACK, the terminal sends the acknowledgement ACK when the DCI is received, and sends the NACK when the DCI is not received.

Manner 2: When a first trigger condition is met, the target configuration information is switched from first configuration information to second configuration information.

The second configuration information is different from the first configuration information, the first configuration information is one of the at least two sets of configuration information, and the second configuration information is one of the at least two sets of configuration information. The first trigger condition is generally a condition for switching between different scenarios or a condition for switching between different requirements in the same scenario. For example, the first trigger condition includes the following content.

(1) A first PDCCH carrying a target DCI format is received. The target DCI format is one of preset DCI formats. That is, the target DCI format may be one of the DCI formats listed in Table 1. Optionally, the target DCI format may be a scheduling DCI format, that is, one of the scheduling DCI formats listed in Table 1. The first PDCCH herein may be received in a connected state, or may be received in an on-duration of a DRX cycle. The on-duration of the DRX cycle is indicated by a DRX on-duration timer parameter in RRC signaling, and is used to represent an on-duration after the terminal wakes up in the DRX cycle.

(2) A second PDCCH that is scrambled by a target RNTI is received, where the target RNTI includes at least one of a cell radio network temporary identifier C-RNTI and a configured scheduling radio network temporary identifier CS-RNTI. In addition, the target RNTI may alternatively include an RNTI of another form listed above. Similar to the first PDCCH, the received second PDCCH may be in a connected state, or may be in an on-duration of a DRX cycle.

For example, in a DRX scenario, if the first PDCCH or the second PDCCH is received in the on-duration of the DRX cycle, the target configuration information is switched from the first configuration information to the second configuration information. For example, the terminal receives at least two sets of different configuration information for PDCCH monitoring. A first set (the first configuration information) is used before the first PDCCH or the second PDCCH is received in the on-duration of the DRX cycle. After the first PDCCH or the second PDCCH is received, the first set is switched to a second set (the second configuration information).

Manner 3: When a second trigger condition is met, the target configuration information is switched from second configuration information to first configuration information.

The second configuration information is different from the first configuration information, the first configuration information is one of the at least two sets of configuration information, and the second configuration information is one of the at least two sets of configuration information. Similar to the first trigger condition, the second trigger condition is also generally a condition for switching between different scenarios or a condition for switching between different requirements in the same scenario. For example, the second trigger condition includes the following content.

(1) A target PDCCH is not received in N time domain transmission units. The target PDCCH carries a target DCI format, or the target PDCCH is scrambled by a target RNTI. The target RNTI includes at least one of a C-RNTI and a CS-RNTI. In addition, the target RNTI may alternatively include an RNTI of another form listed above. Further, the time domain transmission unit includes a slot, a mini-slot, a millisecond, or a time domain symbol (such as OFDM symbol), and N is a positive integer. N is predefined, or N is configured by the network device.

Optionally, the N time domain transmission units may be N downlink time domain transmission units or N uplink or downlink time domain transmission units.

The N time domain transmission units herein may be N consecutive time domain transmission units in the connected state, or may be N consecutive time domain transmission units in the DRX cycle. It should be pointed out that in the DRX scenario, the N time domain transmission units may be N consecutive time domain transmission units in the on-duration of the DRX cycle, or may be N consecutive time domain transmission units in the on-duration and an opportunity for DRX of the DRX cycle.

(2) In a discontinuous reception DRX scenario, an inactivity timer of a DRX cycle expires. The inactivity timer of the DRX cycle is indicated by a DRX inactivity timer parameter in RRC signaling. This parameter indicates the number of PDCCH subframes or slots that need to be monitored after the terminal successfully obtains a PDCCH through decoding.

(3) A DRX common media access control (MAC) control element (CE) is received, and the MAC CE indicates entering an opportunity for DRX of a DRX cycle.

For example, the terminal receives at least two sets of different configuration information for PDCCH monitoring. A first set (the first configuration information) is used before the first PDCCH or the second PDCCH is received in the on-duration of the DRX cycle. After the first PDCCH or the second PDCCH is received, the target configuration information is switched from the first set to the second set (the second configuration information). Starting from a next slot after the first PDCCH or the second PDCCH is received, the terminal monitors the PDCCH based on the second configuration information. If the terminal detects that the inactivity timer expires or the MAC CE indicates entering the opportunity for DRX of the DRX cycle, the target configuration information is switched from the second set to the first set.

It should be pointed out that the DRX cycle described in this embodiment of this disclosure is a short DRX cycle or a long DRX cycle. The short DRX cycle is indicated by a drx-ShortCycle parameter in RRC signaling. This parameter indicates a short cycle period used for DRX. The long DRX cycle is indicated by a drx-LongCycleStartOffset parameter in RRC signaling. This parameter indicates two meanings: a long DRX cycle and a start offset. In addition, the RRC signaling may further include a short cycle timer (drx-ShortCycleTimer) parameter. This parameter indicates the number of consecutive subframes in a short cycle in which no PDCCH is received before the long cycle is entered.

Further, the first configuration information is default configuration information. That the short DRX cycle and the long DRX cycle correspond to different first configuration information means that the short DRX cycle and the long DRX cycle correspond to different default configuration information. That the short DRX cycle and the long DRX cycle correspond to the same first configuration information means that the short DRX cycle and the long DRX cycle correspond to the same default configuration information.

The configuration information described in this embodiment of this disclosure includes information indicating at least one of the following:
- at least one control resource set (CORESET);
- at least one search space (SS);
- at least one PDCCH candidate;
- at least one aggregation level (AL);
- the number of PDCCH candidates;
- a maximum number of PDCCH candidates monitored in each slot; and
- a monitoring parameter, where the monitoring parameter includes at least one of a monitoring periodicity (monitoring Slot Periodicity), a monitoring offset, a monitoring duration, and a monitoring start symbol in a slot. A position of a monitoring start symbol of a slot is indicated by a parameter monitoringSymbolsWithinSlot that is transmitted via higher layer signaling.

For the CORESET, one CORESET includes a plurality of search spaces, and one search space includes a plurality of candidate positions for a physical downlink control channel (PDCCH). The number of CCEs included in one CORESET is called an aggregation level.

For the search space, PDCCH search spaces supported by the system include but are not limited to the following different types:
1. Type0-PDCCH common search space. This type of search space is designed for a PDCCH corresponding to remaining minimum system information (RMSI). A downlink control information DCI format carried in a PDCCH detected in this type of search space carries cyclic redundancy check (CRC) scrambled by an SI-RNTI corresponding to a primary cell (Pcell).
2. Type0A-PDCCH common search space. This type of search space is designed for a PDCCH corresponding to other system information (OSI). A DCI format carried in a PDCCH detected in this type of search space carries CRC scrambled by an SI-RNTI corresponding to a Pcell.
3. Type1-PDCCH common search space. This type of search space is designed for a common PDCCH (or called a normal PDCCH). A DCI format carried in a PDCCH detected in this type of search space carries CRC scrambled by an RA-RNTI, a TC-RNTI, or a C-RNTI corresponding to a Pcell.
4. Type2-PDCCH common search space. A DCI format carried in a PDCCH detected in this type of search space carries CRC scrambled by a paging radio network temporary identifier P-RNTI corresponding to a Pcell.
5. Type3-PDCCHcommon search space. A DCI format carried in a PDCCH detected in this type of search space carries CRC scrambled by an INT-RNTI, an SFI-RNTI, a TPC-PUSCH-RNTI, a TPC-PUCCH-RNTI, a C-RNTI, a CS-RNTI, or an SP-RNTI.
6. UE-specific search space. A DCI format carried in a PDCCH detected in this type of search space carries CRC scrambled by a C-RNTI, a CS-RNTI, or an SP-RNTI.

For the PDCCH candidates, the first configuration information and the second configuration information may include different PDCCH candidates, or the first configuration information and the second configuration information may support different quantities of PDCCH candidates, or the first configuration information and the second configuration information may support different maximum quantities of PDCCH candidates monitored in each slot. A PDCCH candidate includes control channel elements (CCE). Each PDCCH candidate can carry complete DCI. The terminal can perform blind monitoring on a plurality of PDCCH candidates to receive DCI. For the aggregation level, the system can support aggregation levels of one, two, four, eight, and sixteen control channel elements CCE. A common search space supports three CCE aggregation levels. Table 2 shows a correspondence relationship between the three CCE aggregation levels and PDCCH candidates.

TABLE 2

| CCE aggregation level | Number of PDCCH candidates |
| --- | --- |
| 4 | 4 |
| 8 | 2 |
| 16 | 1 |

A specific search space supports all of the five CCE aggregation levels.

Further, a relationship between the first configuration information and the second configuration information in this embodiment of this disclosure includes at least one of the following:

When the configuration information includes at least one control resource set, the number of control resource sets indicated by the first configuration information is greater than the number of control resource sets indicated by the second configuration information. For example, the network device configures, via RRC signaling, two sets of configuration information for PDCCH monitoring. Control resource sets indicated by the two sets of configuration information are: CORESET 0 and CORESET 1 (the first configuration information), two CORESETs in total; and CORESET 0, CORESET 1, CORESET 2, and CORESET 3 (the second configuration information), four CORESETs in total. It is assumed that when the terminal is in a connected state, the terminal performs blind monitoring on the PDCCH based on CORESET 0 and CORESET 1 by default. When a first PDCCH or a second PDCCH is received, the terminal switches to perform blind monitoring on the PDCCH based on CORESET 0, CORESET 1, CORESET 2, and CORESET 3. Then, if a target PDCCH is not received in N consecutive slots, the terminal switches back to perform blind monitoring on the PDCCH based on CORESET 0 and CORESET 1. The switching can be triggered by the DCI.

When configuration information includes at least one search space, the number of search spaces indicated by the first configuration information is greater than the number of search spaces indicated by the second configuration information. For example, the network device configures, via RRC signaling, two sets of configuration information for PDCCH monitoring. Search spaces indicated by the two sets of configuration information are respectively: SS0 and SS1 (the first configuration information), two in total; and SS0, SS1, SS2, and SS3 (the second configuration information), four in total. It is assumed that when the terminal is in a connected state, the terminal performs blind monitoring on the PDCCH based on SS0 and SS1 by default. When a first PDCCH or a second PDCCH is received, the terminal switches to perform blind monitoring on the PDCCH based on SS0, SS1, SS2, and SS3. Then, if a target PDCCH is not received in N consecutive slots, the terminal switches back to perform blind monitoring on the PDCCH based on SS0 and SS1. The switching can be triggered by the DCI.

When the configuration information includes at least one PDCCH candidate or the number of PDCCH candidates, the number of PDCCH candidates indicated by the first configuration information is greater than the number of PDCCH candidates indicated by the second configuration information. For example, the network device configures, via RRC signaling, two sets of configuration information for PDCCH monitoring. PDCCH candidates and the number of PDCCH candidates indicated by the two sets of configuration information are: PDCCH candidates 0 and 1 (the first configuration information), two in total; and PDCCH candidates 0 to 7 (the second configuration information), eight in total. It is assumed that when the terminal is in a connected state, the terminal performs blind monitoring on the PDCCH based on PDCCH candidates 0 and 1 by default. When a first PDCCH or a second PDCCH is received, the terminal switches to perform blind monitoring on the PDCCH based on PDCCH candidates 0 to 7. Then, if a target PDCCH is not received in N consecutive slots, the terminal switches back to perform blind monitoring on the PDCCH based on PDCCH candidates 0 and 1. The switching can be triggered by the DCI.

When the configuration information includes at least one aggregation level, the number of aggregation levels indicated by the first configuration information is greater than the number of aggregation levels indicated by the second configuration information. For example, the network device configures, via RRC signaling, two sets of configuration information for PDCCH monitoring. Aggregation levels indicated by the two sets of configuration information are: AL4, AL8, and AL16 (the first configuration information), three in total; and AL1, AL2, AL4, AL8, and AL16 (the second configuration information), five in total. It is assumed that when the terminal is in a connected state, the terminal performs blind monitoring on the PDCCH based on AL4, AL8, and AL16 by default. When a first PDCCH or a second PDCCH is received, the terminal switches to perform blind monitoring on the PDCCH based on AL1, AL2, AL4, AL8, and AL16. Then, if a target PDCCH is not received in N consecutive slots, the terminal switches back to perform blind monitoring on the PDCCH based on AL4, AL8, and AL16. The switching can be triggered by the DCI.

When the configuration information includes a maximum number of PDCCH candidates monitored in each slot, a maximum number indicated by the first configuration information is greater than a maximum number indicated by the second configuration information. For example, the network device configures, via RRC signaling, two sets of configuration information for PDCCH monitoring. Maximum quantities of PDCCH candidates monitored in each slot indicated by the two sets of configuration information are: 20 (the first configuration information); and 44 (the second configuration information). It is assumed that when the terminal is in a connected state, the terminal performs blind monitoring on the PDCCH based on a maximum of 20 PDCCH candidates by default. When a first PDCCH or a second PDCCH is received, the terminal switches to perform blind monitoring on the PDCCH based on a maximum of 44 PDCCH candidates. Then, if a target PDCCH is not received in N consecutive slots, the terminal switches back to perform blind monitoring on the PDCCH based on a maximum of 20 PDCCH candidates. The switching can be triggered by the DCI.

When the configuration information includes a monitoring parameter, a monitoring periodicity indicated by the first configuration information is less than a monitoring periodicity indicated by the second configuration information. For example, the network device configures, via RRC signaling, two sets of configuration information for PDCCH monitoring. Monitoring slot periodicities indicated by the two sets of configuration information are: monitoring every 20 slots (the first configuration information); and monitoring every 5 slots (the second configuration information). It is assumed that when the terminal is in a connected state, the terminal performs monitoring every 20 slots by default. When a first PDCCH or a second PDCCH is received, the terminal switches to perform monitoring every 5 slots. Then, if a target PDCCH is not received in N consecutive slots, the terminal switches back to perform monitoring every 20 slots. The switching can be triggered by the DCI.

It should be pointed out that when the configuration information includes at least two of the foregoing parameters, the determining and switching of the target configuration information are still applicable. For example, the network device configures, via RRC signaling, two sets of configuration information for PDCCH monitoring. Monitoring slot periodicities indicated by the two sets of configuration information are respectively: monitoring totally two CORESETs, CORESET 0 and CORESET1, every 20 slots (the first configuration information); and monitoring totally four CORESETs, CORESET 0, CORESET1, CORESET2, and CORESET3, every 5 slots (the second configuration information). It is assumed that when the terminal is in a connected state, the terminal performs monitoring on two CORESETs every 20 slots by default. When a first PDCCH or a second PDCCH is received, the terminal switches to perform monitoring on four CORESETs every 5 slots. Then, if a target PDCCH is not received in N consecutive slots, the terminal switches back to perform monitoring on two CORESETs every 20 slots. The switching can be triggered by the DCI. The examples above are merely example descriptions. A combination of other parameters, such as a monitoring periodicity, a control resource set, and a search space, indicated by the configuration information is also applicable to this embodiment. It should be noted that a type and the number of parameters indicated by the configuration information are not limited in this embodiment of this disclosure. A person skilled in the art should know various combination examples of the foregoing parameters. Details are not listed one by one in this embodiment of this disclosure.

Before Step 31, the method further includes: sending report information to the network device, where the report information is used to indicate candidate configuration information for PDCCH monitoring requirements in different scenarios. For example, the report information is used to indicate at least one of the following: first candidate configuration information corresponding to a non-duration of a DRX cycle, second candidate configuration information corresponding to a running period of the inactivity timer in the DRX cycle, and third candidate configuration information corresponding to a case in which DRX is disabled in a connected state. The DRX cycle is a short DRX cycle or a long DRX cycle. That is, the terminal sends the report information to the network device based on monitoring requirements of the terminal in different scenarios. In this way, the network device can generate the at least two sets of configuration information with reference to the report information, to indicate a subsequent PDCCH monitoring behavior of the terminal in different scenarios.

In the channel detection indication method in this embodiment of this disclosure, the terminal determines, from the at least two sets of configuration information, the target configuration information that meets an actual requirement, and monitors the PDCCH based on the target configuration information. This can satisfy PDCCH monitoring in different scenarios and improve transmission efficiency without additional power consumption.

The channel detection indication method in different scenarios is described in the foregoing embodiment. An embodiment below further describes a terminal corresponding to the method with reference to an accompanying drawing.

Figure 4:
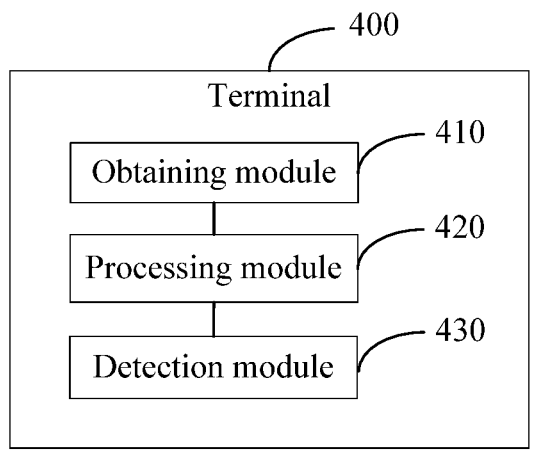
FIG. 4 presents a schematic modular structural diagram of a terminal according to an embodiment of this disclosure.

As shown in FIG. 4, a terminal 400 in this embodiment of this disclosure is capable of implementing details of the method in the foregoing embodiment: obtaining the at least two sets of configuration information, where the at least two sets of configuration information are related to monitoring the physical downlink control channel PDCCH; determining the target configuration information from the at least two sets of configuration information; and monitoring the PDCCH based on the target configuration information, with the same effects achieved. The terminal 400 specifically includes the following function modules:

an obtaining module 410, configured to obtain at least two sets of configuration information, where the at least two sets of configuration information are related to monitoring a physical downlink control channel PDCCH;

a processing module 420, configured to determine target configuration information from the at least two sets of configuration information; and a monitoring module 430, configured to monitor the PDCCH based on the target configuration information.

The PDCCH corresponds to at least one DCI format and/or the PDCCH corresponds to at least one radio network temporary identifier RNTI.

The processing module 420 includes:

a first processing submodule, configured to, based on downlink control information DCI, select one set of configuration information indicated by the DCI, as the target configuration information, from the at least two sets of configuration information; or a second processing submodule, configured to, when a first trigger condition is met, switch the target configuration information from first configuration information to second configuration information; or a third processing submodule, configured to, when a second trigger condition is met, switch the target configuration information from second configuration information to first configuration information, where the second configuration information is different from the first configuration information, the first configuration information is one of the at least two sets of configuration information, and the second configuration information is one of the at least two sets of configuration information.

The first trigger condition includes:
a first PDCCH that carries a target DCI format is received, where the target DCI format is one of preset DCI formats; or
a second PDCCH that is scrambled by a target RNTI is received, where the target RNTI includes at least one of a cell radio network temporary identifier C-RNTI and a configured scheduling radio network temporary identifier CS-RNTI.

The second processing submodule includes:
a first processing unit, configured to, in a discontinuous reception DRX scenario, switch the target configuration information from the first configuration information to the second configuration information if the first PDCCH or the second PDCCH is received during an on-duration of a DRX cycle.

The second trigger condition includes one of the following:
a target PDCCH is not received in N time domain transmission units, where the target PDCCH carries a target DCI format, or the target PDCCH is scrambled by a target RNTI, where the target RNTI includes at least one of a C-RNTI and a CS-RNTI, the time domain transmission unit includes a slot, a mini-slot, a millisecond, or a time domain symbol, and N is a positive integer;
an inactivity timer of a DRX cycle expires in a discontinuous reception DRX scenario; and
a DRX common media access control control element MAC CE is received, and the MAC CE indicates entering an opportunity for DRX of a DRX cycle.

The DRX cycle is a short DRX cycle or a long DRX cycle.

The short DRX cycle and the long DRX cycle correspond to different first configuration information, or the short DRX cycle and the long DRX cycle correspond to the same first configuration information.

N is predefined or configured by the network device.

The configuration information includes information indicating at least one of the following:
at least one control resource set;
at least one search space;
at least one PDCCH candidate;
at least one aggregation level;
the number of PDCCH candidates;
a maximum number of PDCCH candidates monitored in each slot; and
a monitoring parameter, where the monitoring parameter includes at least one of a monitoring periodicity, a monitoring offset, a monitoring duration, and a start monitoring symbol in a slot.

A relationship between the first configuration information and the second configuration information includes at least one of the following:
when the configuration information includes at least one control resource set, the number of control resource sets indicated by the first configuration information is greater than the number of control resource sets indicated by the second configuration information;
when the configuration information includes at least one search space, the number of search spaces indicated by the first configuration information is greater than the number of search spaces indicated by the second configuration information;
when the configuration information includes at least one PDCCH candidate or the number of PDCCH candidates, the number of PDCCH candidates indicated by the first configuration information is greater than the number of PDCCH candidates indicated by the second configuration information;

when the configuration information includes at least one aggregation level, the number of aggregation levels indicated by the first configuration information is greater than the number of aggregation levels indicated by the second configuration information;

when the configuration information includes a maximum number of PDCCH candidates monitored in each slot, a maximum number indicated by the first configuration information is greater than a maximum number indicated by the second configuration information; and when the configuration information includes a monitoring parameter, a monitoring periodicity indicated by the first configuration information is less than a monitoring periodicity indicated by the second configuration information.

The processing module 420 further includes:

a detection submodule, configured to detect the DCI; and a feedback submodule, configured to send, based on a detection result of the DCI, an acknowledgement or a non-acknowledgement ACK/NACK to a network device.

The DCI is scheduling DCI or non-scheduling DCI.

The terminal 400 further includes:

a report module, configured to send report information to a network device, where the report information is used to indicate at least one of the following:

first candidate configuration information corresponding to an on-duration of a DRX cycle, where the DRX cycle is a short DRX cycle or a long DRX cycle;

second candidate configuration information corresponding to a running period of an inactivity timer in the DRX cycle; and third candidate configuration information corresponding to a case in which DRX is disabled in a connected state.

The at least two sets of configuration information is predefined, or the at least two sets of configuration information is configured by a network device via radio resource control RRC signaling.

It should be pointed out that the terminal in this embodiment of this disclosure determines, from the at least two sets of configuration information that are configured by the network device and that are related to PDCCH monitoring, the target configuration information that meets an actual requirement, and monitors the PDCCH based on the target configuration information. This can satisfy PDCCH monitoring in different scenarios and improve transmission efficiency without additional power consumption.

Figures 5, 6:
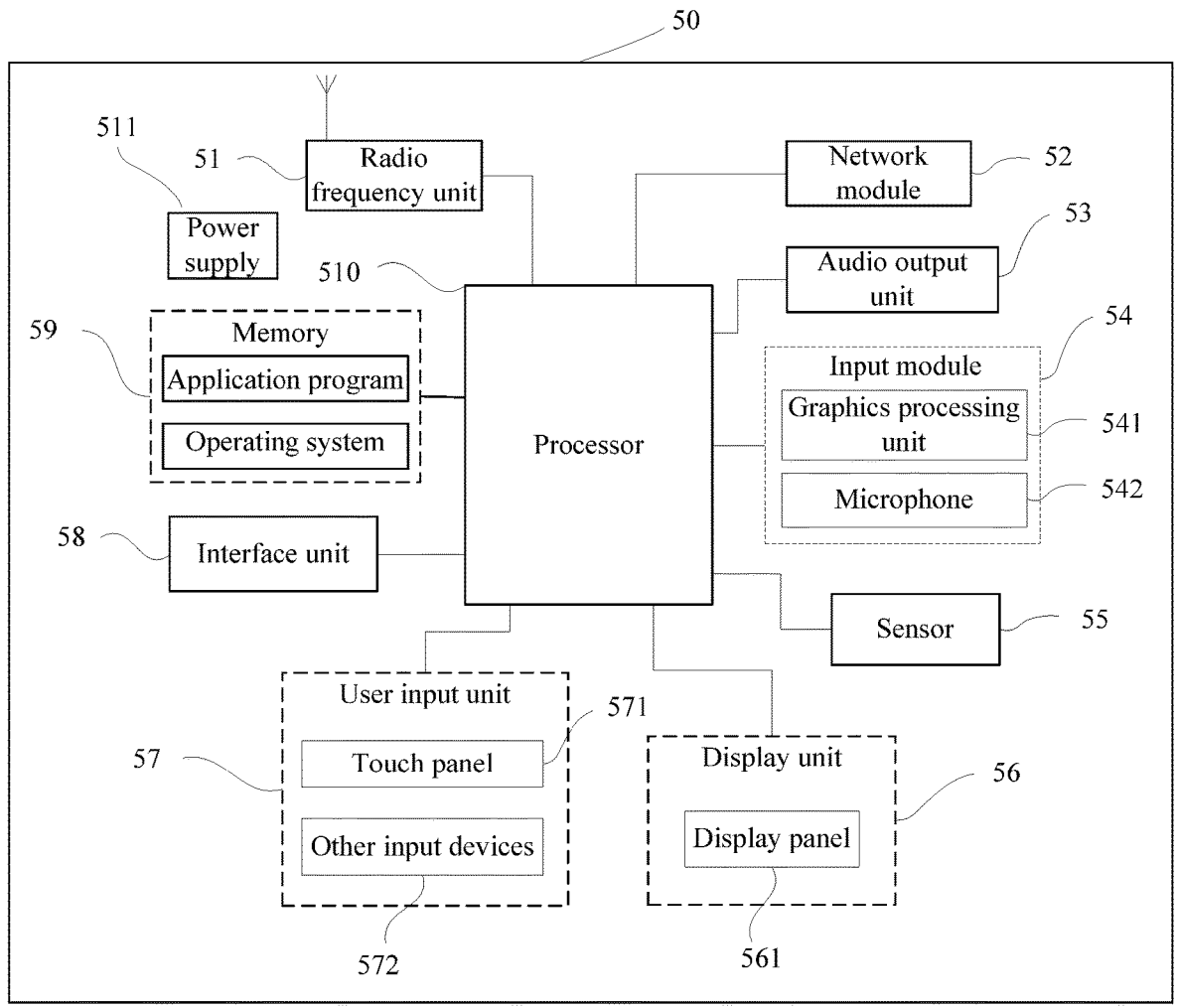
FIG. 5 presents a block diagram of a terminal according to an embodiment of this disclosure.
FIG. 6 presents a schematic flowchart of a channel detection indication method of a network device according to an embodiment of this disclosure.

To better achieve the foregoing objective, further, FIG. 5 is a schematic diagram of a hardware structure of a terminal (50) for implementing each embodiment of this disclosure. The terminal 50 includes but is not limited to components such as a radio frequency unit 51, a network module 52, an audio output unit 53, an input unit 54, a sensor 55, a display unit 56, a user input unit 57, an interface unit 58, a memory 59, a processor 510, and a power supply 511. A person skilled in the art can understand that the structure of the terminal shown in FIG. 5 does not constitute a limitation on the terminal, and the terminal may include more or fewer components than those shown in the figure, or a combination of some of the components, or a different arrangement of the components. In this embodiment of this disclosure, the terminal includes but is not limited to a mobile phone, a tablet computer, a laptop computer, a personal digital assistant, an in-vehicle terminal, a wearable device, or a pedometer.

The radio frequency unit 51 is configured to obtain at least two sets of configuration information, where the at least two sets of configuration information are related to monitoring a physical downlink control channel PDCCH.

The processor 510 is configured to determine target configuration information from the at least two sets of configuration information, and monitor the PDCCH based on the target configuration information.

The terminal in this embodiment of this disclosure determines, from the at least two sets of configuration information that are configured by the network device and that are related to PDCCH monitoring, the target configuration information that meets an actual requirement, and monitors the PDCCH based on the target configuration information. This can satisfy PDCCH monitoring in different scenarios and improve transmission efficiency without additional power consumption.

It should be understood that in this embodiment of this disclosure, the radio frequency unit 51 may be configured to: receive and send signals in an information receiving/sending process or a call process. Specifically, the radio frequency unit 51 receives downlink data from a base station and delivers the downlink data to the processor 510 for processing; and, in addition, the radio frequency unit 51 sends uplink data to the base station. Typically, the radio frequency unit 51 includes but is not limited to an antenna, at least one amplifier, a transceiver, a coupler, a low noise amplifier, a duplexer, and the like. In addition, the radio frequency unit 51 may further communicate with a network and other devices through a wireless communications system.

The terminal provides wireless broadband Internet access for a user by using the network module 52 and helps the user to, for example, send or receive an email, browse a webpage, or access streaming media.

The audio output unit 53 may convert audio data that is received by the radio frequency unit 51 or the network module 52 or that is stored in the memory 59 into an audio signal and output the audio signal as a sound. In addition, the audio output unit 53 may further provide audio output (for example, a call signal received sound and a message received sound) that is related to a specific function performed by the terminal 50. The audio output unit 53 includes a loudspeaker, a buzzer, a receiver, or the like.

The input unit 54 is configured to receive an audio or video signal. The input unit 54 may include a graphics processing unit (GPU) 541 and a microphone 542, and the graphics processing unit 541 processes image data in a static picture or video obtained by an image capture apparatus (for example, a camera) in an image capture mode or a video capture mode. A processed image frame may be displayed on the display unit 56. An image frame processed by the graphics processing unit 541 may be stored in the memory 59 (or other storage media) or sent by the radio frequency unit 51 or the network module 52. The microphone 542 can receive a sound and is capable of processing the sound as audio data. The processed audio data may be converted, in a phone service mode, into a format that can be sent by the radio frequency unit 51 to a mobile communication base station.

The terminal 50 further includes at least one sensor 55, for example, an optical sensor, a motion sensor, and other sensors. Specifically, the optical sensor includes an ambient light sensor and a proximity sensor. The ambient light sensor may adjust brightness of a display panel 561 based on intensity of ambient light, and the proximity sensor may turn off the display panel 561 and/or backlighting when the terminal 50 moves near an ear. As a type of motion sensor, an accelerometer sensor can detect a value of an acceleration in each direction (there are usually three axes), can detect a magnitude and a direction of gravity when the terminal is static, and may be configured for terminal posture recognition (for example, screen switching between landscape and portrait, a related game, and magnetometer posture calibration), vibration recognition related functions (for example, pedometer and knocking), and the like. The sensor 55 may further include a fingerprint sensor, a pressure sensor, an iris sensor, a molecular sensor, a gyroscope, a barometer, a hygrometer, a thermometer, an infrared sensor, or the like. Details are not described herein.

The display unit 56 is configured to display information input by the user or information provided for the user. The display unit 56 may include a display panel 561. The display panel 561 may be configured in a form of a liquid crystal display (LCD), an organic light-emitting diode (OLED), or the like.

The user input unit 57 may be configured to receive input digit or character information, and generate a key signal input related to user settings and function control of the terminal. Specifically, the user input unit 57 includes a touch panel 571 and other input devices 572. The touch panel 571, also referred to as a touchscreen, may capture a touch operation of a user on or near the touch panel (for example, an operation performed by the user by using any appropriate object or accessory such as a finger or a stylus on the touch panel 571 or near the touch panel 571). The touch panel 571 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to touch coordinates, and transmits the touch coordinates to the processor 510, and receives and executes a command sent by the processor 510. In addition, the touch panel 571 may be implemented in various types, for example, as a resistive, capacitive, infrared, or surface acoustic wave touch panel. The user input unit 57 may further include the other input devices 572 in addition to the touch panel 571. Specifically, the other input devices 572 may include but are not limited to a physical keyboard, a function key (such as a volume control key or a switch key), a trackball, a mouse, a joystick, and the like. Details are not described herein.

Further, the touch panel 571 may cover the display panel 561. After detecting a touch operation on or near the touch panel 571, the touch panel 571 transmits the touch operation to the processor 510 for determining a touch event type. Subsequently, the processor 510 provides corresponding visual output on the display panel 561 based on the touch event type. In FIG. 5, the touch panel 571 and the display panel 561 are used as two separate components to implement input and output functions of the terminal. However, in some embodiments, the touch panel 571 may be integrated with the display panel 561 to implement the input and output functions of the terminal. This is not specifically limited herein.

The interface unit 58 is an interface for an external apparatus to connect to the terminal 50. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 58 may be configured to receive input (for example, data information and electric power) from the external apparatus and transmit the received input to one or more elements in the terminal 50; or may be configured to transmit data between the terminal 50 and the external apparatus.

The memory 59 may be configured to store software programs and various data. The memory 59 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 59 may include a high-speed random access memory, and may further include a non-volatile memory, for example, at least one magnetic disk storage device, a flash memory device, or other volatile solid-state storage devices.

The processor 510 is a control center of the terminal that connects various parts of the entire terminal by using various interfaces and lines. The processor 510 performs various functions of the terminal and processes data by running or executing a software program and/or modules stored in the memory 59 and calling data stored in the memory 59, so as to perform overall monitoring on the terminal. The processor 510 may include one or more processing units. Optionally, an application processor and a modem processor may be integrated into the processor 510. The application processor mainly processes an operating system, a user interface, an application program, and the like. The modem processor mainly processes wireless communication. It can be understood that the foregoing modem processor may alternatively be not integrated into the processor 510.

The terminal 50 may further include the power supply 511 (for example, a battery) that supplies power to each component. Optionally, the power supply 511 may be logically connected to the processor 510 through a power management system. In this way, functions such as charging management, discharging management, and power consumption management are implemented through the power management system.

In addition, the terminal 50 may include some function modules that are not shown. Details are not described herein.

Optionally, an embodiment of this disclosure further provides a terminal, including: a processor 510, a memory 59, and a computer program stored in the memory 59 and capable of running on the processor 510. When the computer program is executed by the processor 510, the procedures of the foregoing channel detection indication method embodiment are implemented, with the same technical effects achieved. To avoid repetition, details are not described herein again. The terminal may be a wireless terminal or a wired terminal. The wireless terminal may be a device that provides a user with voice and/or other service data connectivity, a handheld device with a wireless connection function, or other processing devices connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, a remote terminal, an access terminal, a user terminal, a user agent, or a user device (User Device or User Equipment). This is not limited herein.

An embodiment of this disclosure further provides a computer-readable storage medium, where the computer-readable storage medium stores a computer program. When the computer program is executed by a processor, the procedures of the foregoing channel detection indication method embodiment are implemented, with the same technical effects achieved. To avoid repetition, details are not described herein again. For example, the computer-readable storage medium is a read-only memory (ROM), a random access memory (RAM), a magnetic disk, or an optical disc.

The foregoing embodiment describes the channel detection indication method in this disclosure from a terminal side. An embodiment below further describes a channel detection indication method from a network device side with reference to an accompanying drawing.

As shown in FIG. 6, the channel detection indication method according to this embodiment of this disclosure is applied to the network device side. The method includes the following steps:

Step 61: Send, via radio resource control RRC signaling, at least two sets of configuration information to a terminal, where the at least two sets of configuration information are related to monitoring a physical downlink control channel PDCCH.

The at least two sets of configuration information each correspond to PDCCH monitoring in different scenarios. In addition, the at least two sets of configuration information may be predefined (for example, agreed on in a protocol). This embodiment merely uses an example in which the at least two sets of configuration information are configured by the network device for description.

The PDCCH in this embodiment of this disclosure corresponds to at least one DCI format and/or the PDCCH corresponds to at least one radio network temporary identifier RNTI. For example, the PDCCH corresponds to at least one of scheduling DCI formats, or corresponds to at least one of non-scheduling DCI formats, or corresponds to at least one of a scheduling DCI format and a non-scheduling DCI format. Further, after Step 61, the method further includes: sending downlink control information DCI to the terminal, where the DCI is used to indicate target configuration information in the at least two sets of configuration information. The DCI is scheduling DCI or non-scheduling DCI. In other words, the network device configures, via RRC, the at least two sets of configuration information that are related to PDCCH monitoring in different scenarios, and dynamically indicates, through the DCI, the terminal to select one set for PDCCH monitoring. This can satisfy PDCCH monitoring in different scenarios and improve transmission efficiency without additional power consumption.

After the step of sending downlink control information DCI to the terminal, the method further includes: receiving an acknowledgement or a non-acknowledgement ACK/NACK, where the ACK/NACK is sent by the terminal based on whether the DCI is detected. Specifically, if the DCI is detected, the terminal sends the ACK to the network device. Or, if the DCI is not detected, the terminal sends the NACK to the network device.

The configuration information described in this embodiment of this disclosure includes but is not limited to information indicating at least one of the following:
  at least one control resource set;
  at least one search space;
  at least one PDCCH candidate;
  at least one aggregation level;
  the number of PDCCH candidates;
  a maximum number of PDCCH candidates monitored in each slot; and
  a monitoring parameter, where the monitoring parameter includes at least one of a monitoring periodicity, a monitoring offset, a monitoring duration, and a start monitoring symbol in a slot.

It should be pointed out that for descriptions of the foregoing parameters in the configuration information, reference may be made to terminal side embodiments. Details are not described herein.

Further, before Step 61, the method may further include: receiving report information, where the report information is used to indicate candidate configuration information for PDCCH monitoring requirements of the terminal in different scenarios. For example, the report information is used to indicate at least one of the following:
  first candidate configuration information corresponding to an on-duration of a DRX cycle in which the terminal resides, where the DRX cycle is a short DRX cycle or a long DRX cycle;
  second candidate configuration information corresponding to a running period of an inactivity timer in the DRX cycle in which the terminal resides; and
  third candidate configuration information corresponding to a case in which DRX is disabled in a connected state.

In this way, the network device can generate the at least two sets of configuration information with reference to the report information, to indicate a subsequent PDCCH monitoring behavior of the terminal in different scenarios.

In the channel detection indication method in this embodiment of this disclosure, the network device configures, for the terminal, the at least two sets of configuration information that are related to PDCCH monitoring. The terminal determines, from the at least two sets of configuration information, the target configuration information that meets an actual requirement, and monitors the PDCCH based on the target configuration information. This can satisfy PDCCH monitoring in different scenarios and improve transmission efficiency without additional power consumption.

The channel detection indication method in different scenarios is described in detail in the foregoing embodiment. An embodiment below further describes a network device corresponding to the method with reference to an accompanying drawing.

Figure 7:
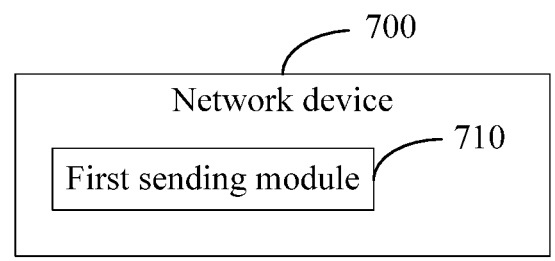
FIG. 7 presents a schematic modular structural diagram of a network device according to an embodiment of this disclosure.

As shown in FIG. 7, a network device 700 in this embodiment of this disclosure is capable of implementing details of the method in the foregoing embodiment: sending, via radio resource control RRC signaling, the at least two sets of configuration information to the terminal, where the at least two sets of configuration information are related to monitoring the physical downlink control channel PDCCH, with the same effects achieved. The network device 700 specifically includes the following function modules:
  a first sending module 710, configured to send, via radio resource control RRC signaling, at least two sets of configuration information to a terminal, where the at least two sets of configuration information are related to monitoring a physical downlink control channel PDCCH.

The PDCCH corresponds to at least one DCI format and/or the PDCCH corresponds to at least one radio network temporary identifier RNTI.

The configuration information includes information indicating at least one of the following:
- at least one control resource set;
- at least one search space;
- at least one PDCCH candidate;
- at least one aggregation level;
- the number of PDCCH candidates;
- a maximum number of PDCCH candidates monitored in each slot; and
- a monitoring parameter, where the monitoring parameter includes at least one of a monitoring periodicity, a monitoring offset, a monitoring duration, and a start monitoring symbol in a slot.

The network device 700 further includes:
a second sending module, configured to send downlink control information DCI to the terminal, where the DCI is used to indicate target configuration information in the at least two sets of configuration information.

The DCI is scheduling DCI or non-scheduling DCI.

The network device 700 further includes:
a first receiving module, configured to receive an acknowledgement or a non-acknowledgement ACK/NACK, where the ACK/NACK is sent by the terminal based on whether the DCI is detected.

The network device 700 further includes:
a second receiving module, configured to receive report information, where the report information is used to indicate at least one of the following:
first candidate configuration information corresponding to an on-duration of a DRX cycle in which the terminal resides, where the DRX cycle is a short DRX cycle or a long DRX cycle;
second candidate configuration information corresponding to a running period of an inactivity timer in the DRX cycle in which the terminal resides; and
third candidate configuration information corresponding to a case in which DRX is disabled in a connected state.

It should be pointed out that the network device in this embodiment of this disclosure configures, for the terminal, at least two sets of configuration information that are related to PDCCH monitoring. The terminal determines, from the at least two sets of configuration information, the target configuration information that meets an actual requirement, and monitors the PDCCH based on the target configuration information. This can satisfy PDCCH monitoring in different scenarios and improve transmission efficiency without additional power consumption.

It should be noted that, it should be understood that division of modules of the network device and the terminal is merely logical function division. The modules may be all or partially integrated in a physical entity or may be separated physically in an actual implementation. In addition, the modules may be all implemented in a form of software invoked by a processing component, or may be all implemented in a form of hardware; or a part of modules may be implemented in a form of software invoked by a processing component, and another part of modules may be implemented in a form of hardware. For example, the determining module may be a processing component that is separately disposed, or may be integrated in a chip of the apparatus for implementation. In addition, the determining module may be stored in a memory of the apparatus in a form of program code, and is invoked by a processing component of the apparatus to perform a function of the determining module. Implementation of other modules is similar to this. In addition, the modules may be all or partially integrated, or may be implemented independently. Herein, the processing component may be an integrated circuit, and has a signal processing capability. In an implementation process, steps in the foregoing method or the foregoing modules can be implemented by using a hardware integrated logical circuit in the processor component, or by using instructions in a form of software.

For example, the modules may be configured as one or more integrated circuits for implementing the foregoing method, for example, one or more application-specific integrated circuits (ASIC), or one or more microprocessors (eg, DSP), or one or more field programmable gate arrays (FPGA). For another example, when one of the foregoing modules is implemented in a form of program code invoked by the processing component, the processing component may be a general processor, for example, a central processing unit (CPU) or another processor that may invoke program code. For another example, the modules may be integrated and implemented in a form of a system-on-a-chip (SOC).

To better achieve the foregoing objective, an embodiment of this disclosure further provides a network device, including a processor, a memory, and a computer program stored in the memory and capable of running on the processor, where when the processor executes the computer program, the steps of the foregoing channel detection indication method are implemented. An embodiment of the present invention further provides a computer-readable storage medium, where the computer-readable storage medium stores a computer program, and when the computer program is executed by a processor, steps of the foregoing channel detection indication method are implemented.

Figure 8:
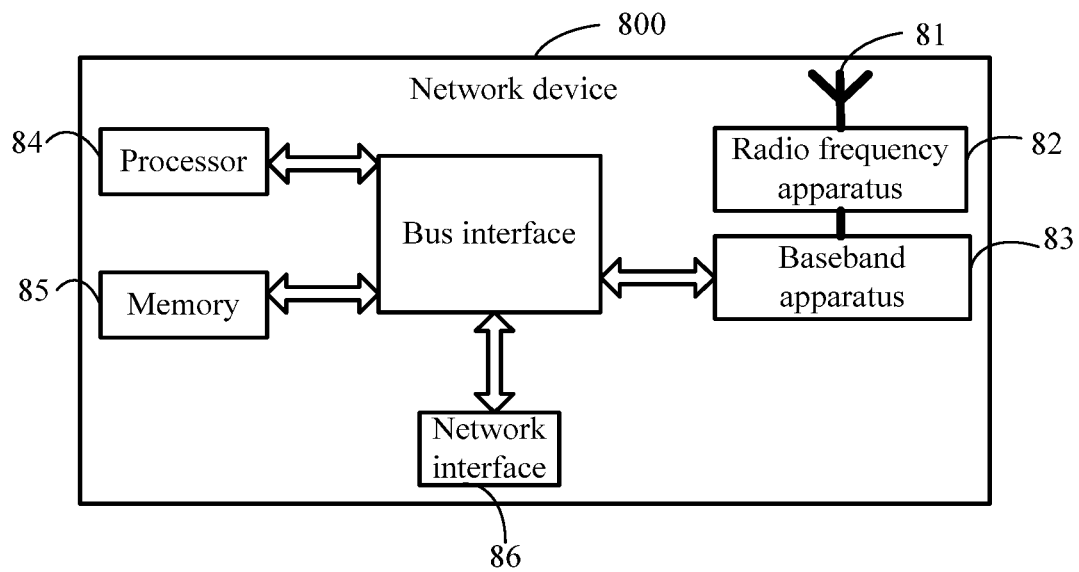
FIG. 8 presents a block diagram of a network device according to an embodiment of this disclosure.

Specifically, an embodiment of this disclosure further provides a network device. As shown in FIG. 8, the network device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and sends the received information to the baseband apparatus 83 for processing. In a downlink direction, the baseband apparatus 83 processes to-be-sent information, and sends the information to the radio frequency apparatus 82; and the radio frequency apparatus 82 processes the received information and then sends the information out by using the antenna 81.

The foregoing frequency band processing apparatus may be located in the baseband apparatus 83. The method performed by the network device in the foregoing embodiment may be implemented in the baseband apparatus 83, and the baseband apparatus 83 includes a processor 84 and a memory 85.

The baseband apparatus 83 may include, for example, at least one baseband processing unit, where a plurality of chips are disposed on the baseband processing unit. As shown in FIG. 8, one of the chips is, for example, the processor 84, connected to the memory 85, to invoke the program in the memory 85 to perform the operation of the network device shown in the foregoing method embodiment.

The baseband apparatus 83 may further include a network interface 86, configured to exchange information with the radio frequency apparatus 82, where the interface is, for example, a common public radio interface (CPRI).

Herein, the processor may be one processor, or may be a collective term for a plurality of processing components. For example, the processor may be a CPU, or may be an ASIC, or is configured as one or more integrated circuits for implementing the method performed by the network device, for example, one or more microprocessors DSPs, or one or more field programmable gate arrays FPGAs. A storage component may be a memory, or may be a collective term for a plurality of storage components.

The memory 85 may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchronous link dynamic random access memory (SLDRAM), and a direct rambus random access memory (DRRAM). The memory 85 described in this application is intended to include but is not limited to these and any other suitable types of memories.

Specifically, the network device in this embodiment of this disclosure further includes a computer program stored in the memory 85 and capable of running on the processor 84. The processor 84 invokes the computer program in the memory 85 to perform the method performed by each module shown in FIG. 7.

Specifically, when invoked by the processor 84, the computer program can be used to implement the following: sending, via radio resource control RRC signaling, at least two sets of configuration information to a terminal, where the at least two sets of configuration information are related to monitoring a physical downlink control channel PDCCH.

The PDCCH corresponds to at least one DCI format and/or the PDCCH corresponds to at least one radio network temporary identifier RNTI.

The configuration information includes information indicating at least one of the following:
  at least one control resource set;
  at least one search space;
  at least one PDCCH candidate;
  at least one aggregation level;
  the number of PDCCH candidates;
  a maximum number of PDCCH candidates monitored in each slot; and
  a monitoring parameter, where the monitoring parameter includes at least one of a monitoring periodicity, a monitoring offset, a monitoring duration, and a start monitoring symbol in a slot.

When invoked by the processor 84, the computer program can be used to implement the following: sending downlink control information DCI to the terminal, where the DCI is used to indicate target configuration information in the at least two sets of configuration information.

The DCI is scheduling DCI or non-scheduling DCI.

When invoked by the processor 84, the computer program can be used to implement the following: receiving an acknowledgement or a non-acknowledgement ACK/NACK, where the ACK/NACK is sent by the terminal based on whether the DCI is detected.

When invoked by the processor 84, the computer program can be used to implement the following: receiving report information, where the report information is used to indicate at least one of the following:
  first candidate configuration information corresponding to an on-duration of a DRX cycle in which the terminal resides, where the DRX cycle is a short DRX cycle or a long DRX cycle;
  second candidate configuration information corresponding to a running period of an inactivity timer in the DRX cycle in which the terminal resides; and
  third candidate configuration information corresponding to a case in which DRX is disabled in a connected state.

The network device may be a base transceiver station (BTS) in a global system for mobile communications (GSM) or code division multiple access (CDMA), or may be a NodeB (NB) in wideband code division multiple access (WCDMA), or may be an evolved NodeB (Evolutional NodeB, eNB or eNodeB), a relay station, or an access point in LTE, or may be a base station in a future 5G network, or the like, which is not limited herein.

The network device in this embodiment of this disclosure configures, for the terminal, the at least two sets of configuration information that are related to PDCCH monitoring. The terminal determines, from the at least two sets of configuration information, the target configuration information that meets an actual requirement, and monitors the PDCCH based on the target configuration information. This can satisfy PDCCH monitoring in different scenarios and improve transmission efficiency without additional power consumption.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein gain.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communication connections through some interfaces, devices or units, and may be in electrical, mechanical, or other forms.

The units described as separate parts may or may not be physically separate. Components displayed as units may or may not be physical units, that is, they may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

In addition, it should be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence, and some steps may be performed in parallel or independently. A person of ordinary skill in the art can understand that all or any steps or components of the method and apparatus in this disclosure may be implemented by hardware, firmware, software, or a combination thereof in any computing apparatus (including a processor, a storage medium, and the like) or a network of a computing apparatus. This can be implemented as long as a person of ordinary skill in the art applies basic programming skill after reading the specification of this disclosure.

Therefore, an objective of this disclosure may also be achieved by running a program or a group of programs on any computing apparatus. The computing apparatus may be a well-known general apparatus. Therefore, the objective of this disclosure may also be achieved by merely providing a program product including program code for implementing the method or apparatus. To be specific, the program product also constitutes this disclosure, and a storage medium storing the program product also constitutes this disclosure. Apparently, the storage medium may be any well-known storage medium or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence. Some steps may be performed in parallel or independently.

The foregoing descriptions are merely optional implementations of this disclosure. It should be noted that a person of ordinary skill in the art may make several improvements or polishing without departing from the principle of this disclosure and the improvements and polishing shall fall within the protection scope of this disclosure.

What is claimed is:

1. A channel detection indication method, applied to a terminal and comprising:
   obtaining at least two sets of configuration information, wherein the at least two sets of configuration information are related to monitoring a physical downlink control channel (PDCCH);
   determining target configuration information from the at least two sets of configuration information; and
   monitoring the PDCCH based on the target configuration information;
   wherein the at least two sets of configuration information are predefined, or the at least two sets of configuration information are configured by a network device via radio resource control (RRC) signaling, the step of determining target configuration information from the at least two sets of configuration information comprises one of following:
   based on downlink control information (DCI), selecting one set of configuration information that is indicated by the DCI, as the target configuration information, from the at least two sets of configuration information;
   switching the target configuration information from first configuration information to second configuration information when a first trigger condition is met; and
   switching the target configuration information from the second configuration information to the first configuration information, when a second trigger condition is met,
   wherein the second configuration information is different from the first configuration information, the first configuration information is one of the at least two sets of configuration information, and the second configuration information is one of the at least two sets of configuration information;
   wherein the first trigger condition comprises:
   a first PDCCH that carries a target DCI format is received, wherein the target DCI format is one of preset DCI formats; or
   a second PDCCH that is scrambled by a target RNTI is received, wherein the target RNTI comprises at least one of a cell radio network temporary identifier (C-RNTI) and a configured scheduling radio network temporary identifier (CS-RNTI);
   wherein the second trigger condition comprises one of the following:
   a target PDCCH is not received in N time domain transmission units, wherein the target PDCCH carries a target DCI format, or the target PDCCH is scrambled by a target RNTI, wherein the target RNTI comprises at least one of a C-RNTI and a CS-RNTI; the time domain transmission unit comprises a slot, a mini-slot, a millisecond, or a time domain symbol, and N is a positive integer;
   an inactivity timer of a DRX cycle expires in a discontinuous reception (DRX) scenario; and
   a DRX common media access control control element (MAC CE) is received, and the MAC CE indicates entering an opportunity for DRX of a DRX cycle.

2. The channel detection indication method according to claim 1, wherein the PDCCH corresponds to at least one DCI format, and/or the PDCCH corresponds to at least one radio network temporary identifier (RNTI).

3. The channel detection indication method according to claim 1, wherein the step of switching the target configuration information from first configuration information to second configuration information when a first trigger condition is met comprises:
in a discontinuous reception (DRX) scenario, switching the target configuration information from the first configuration information to the second configuration information if the first PDCCH or the second PDCCH is received during an on-duration of a DRX cycle.

4. The channel detection indication method according to claim 3, wherein the DRX cycle is a short DRX cycle or a long DRX cycle;
wherein the short DRX cycle and the long DRX cycle correspond to different first configuration information, or the short DRX cycle and the long DRX cycle correspond to the same first configuration information.

5. The channel detection indication method according to claim 1, wherein the configuration information comprises information indicating at least one of the following:
at least one control resource set;
at least one search space;
at least one PDCCH candidate;
at least one aggregation level;
the number of PDCCH candidates;
a maximum number of PDCCH candidates monitored in each slot; and
a monitoring parameter, wherein the monitoring parameter comprises at least one of a monitoring periodicity, a monitoring offset, a monitoring duration, or a start monitoring symbol in a slot.

6. The channel detection indication method according to claim 5, wherein a relationship between the first configuration information and the second configuration information includes at least one of the following:
when the configuration information comprises at least one control resource set, the number of control resource sets indicated by the first configuration information is greater than the number of control resource sets indicated by the second configuration information;
when the configuration information comprises at least one search space, the number of search spaces indicated by the first configuration information is greater than the number of search spaces indicated by the second configuration information;
when the configuration information comprises at least one PDCCH candidate or the number of PDCCH candidates, the number of PDCCH candidates indicated by the first configuration information is greater than the number of PDCCH candidates indicated by the second configuration information;
when the configuration information comprises at least one aggregation level, the number of aggregation levels indicated by the first configuration information is greater than the number of aggregation levels indicated by the second configuration information;
when the configuration information comprises a maximum number of PDCCH candidates monitored in each slot, a maximum number indicated by the first configuration information is greater than a maximum number indicated by the second configuration information; and
when the configuration information comprises a monitoring parameter, a monitoring periodicity indicated by the first configuration information is less than a monitoring periodicity indicated by the second configuration information.

7. The channel detection indication method according to claim 1, wherein before the step of based on downlink control information (DCI), selecting one set of configuration information that is indicated by the DCI, as the target configuration information, from the at least two sets of configuration information, the method further comprises:
detecting the DCI; and
sending, based on a detection result of the DCI, an acknowledgement or a non-acknowledgement (ACK/NACK) to a network device.

8. The channel detection indication method according to claim 1, wherein before the step of obtaining at least two sets of configuration information, the method further comprises:
sending report information to a network device, wherein the report information is used to indicate at least one of the following:
first candidate configuration information corresponding to an on-duration of a DRX cycle, wherein the DRX cycle is a short DRX cycle or a long DRX cycle;
second candidate configuration information corresponding to a running period of an inactivity timer in the DRX cycle; and
third candidate configuration information corresponding to a case in which DRX is disabled in a connected state.

9. A terminal, comprising a processor; a memory; and a program stored in the memory and running on the processor, wherein when the program is executed by the processor, the terminal is caused to perform the steps of:
obtaining at least two sets of configuration information, wherein the at least two sets of configuration information are related to monitoring a physical downlink control channel (PDCCH);
determining target configuration information from the at least two sets of configuration information; and
monitoring the PDCCH based on the target configuration information;
wherein the at least two sets of configuration information are predefined, or the at least two sets of configuration information are configured by a network device via radio resource control (RRC) signaling, the processor is specifically configured to perform one of following:
based on downlink control information (DCI), select one set of configuration information that is indicated by the DCI, as the target configuration information, from the at least two sets of configuration information;
switch the target configuration information from first configuration information to second configuration information when a first trigger condition is met; and
switch the target configuration information from the second configuration information to the first configuration information, when a second trigger condition is met,
wherein the second configuration information is different from the first configuration information, the first configuration information is one of the at least two sets of configuration information, and the second configuration information is one of the at least two sets of configuration information;
wherein the first trigger condition comprises:
a first PDCCH that carries a target DCI format is received, wherein the target DCI format is one of preset DCI formats; or
a second PDCCH that is scrambled by a target RNTI is received, wherein the target RNTI comprises at least one of a cell radio network temporary identifier (C-RNTI) and a configured scheduling radio network temporary identifier (CS-RNTI);

wherein the second trigger condition comprises one of the following:

a target PDCCH is not received in N time domain transmission units, wherein the target PDCCH carries a target DCI format, or the target PDCCH is scrambled by a target RNTI, wherein the target RNTI comprises at least one of a C-RNTI and a CS-RNTI; the time domain transmission unit comprises a slot, a mini-slot, a millisecond, or a time domain symbol, and N is a positive integer;

an inactivity timer of a DRX cycle expires in a discontinuous reception (DRX) scenario; and a DRX common media access control control element (MAC CE) is received, and the MAC CE indicates entering an opportunity for DRX of a DRX cycle.

10. The terminal according to claim 9, wherein the processor is specifically configured to:

in a discontinuous reception (DRX) scenario, switch the target configuration information from the first configuration information to the second configuration information if the first PDCCH or the second PDCCH is received during an on-duration of a DRX cycle.

11. The terminal according to claim 9, wherein the configuration information comprises information indicating at least one of the following:

at least one control resource set;
at least one search space;
at least one PDCCH candidate;
at least one aggregation level;
the number of PDCCH candidates;
a maximum number of PDCCH candidates monitored in each slot; and
a monitoring parameter, wherein the monitoring parameter comprises at least one of a monitoring periodicity, a monitoring offset, a monitoring duration, or a start monitoring symbol in a slot.

12. A network device, wherein the network device comprises a processor; a memory; and a program stored in the memory and running on the processor, wherein when the processor executes the program, the network device is caused to perform steps of:

sending, via radio resource control (RRC) signaling, at least two sets of configuration information to a terminal, wherein the at least two sets of configuration information are related to monitoring a physical downlink control channel (PDCCH);

sending downlink control information (DCI) to the terminal, wherein the DCI is used to indicate target configuration information in the at least two sets of configuration information;

wherein before sending at least two sets of configuration information to a terminal, the processor is configured to:

receive report information, wherein the report information is used to indicate at least one of the following:

first candidate configuration information corresponding to an on-duration of a DRX cycle in which the terminal resides, wherein the DRX cycle is a short DRX cycle or a long DRX cycle;

second candidate configuration information corresponding to a running period of an inactivity timer in the DRX cycle in which the terminal resides; and third candidate configuration information corresponding to a case in which DRX is disabled in a connected state.

13. The network device according to claim 12, wherein the configuration information comprises information indicating at least one of the following:

at least one control resource set;
at least one search space;
at least one PDCCH candidate;
at least one aggregation level;
the number of PDCCH candidates;
a maximum number of PDCCH candidates monitored in each slot; and
a monitoring parameter, wherein the monitoring parameter comprises at least one of a monitoring periodicity, a monitoring offset, a monitoring duration, and a start monitoring symbol in a slot.

* * * * *